(12) United States Patent
Talmor et al.

(10) Patent No.: US 7,689,832 B2
(45) Date of Patent: Mar. 30, 2010

(54) BIOMETRIC-BASED SYSTEM AND METHOD FOR ENABLING AUTHENTICATION OF ELECTRONIC MESSAGES SENT OVER A NETWORK

(75) Inventors: Eli Talmor, Haifa (IL); Rita Talmor, Haifa (IL); Alon Talmor, Haifa (IL)

(73) Assignee: SentryCom Ltd., Haifa (IL)

( * ) Notice: Subject to any disclaimer, the term of this patent is extended or adjusted under 35 U.S.C. 154(b) by 1149 days.

(21) Appl. No.: 10/344,162

(22) PCT Filed: Sep. 5, 2001

(86) PCT No.: PCT/US01/27381

§ 371 (c)(1),
(2), (4) Date: Feb. 10, 2003

(87) PCT Pub. No.: WO02/23796

PCT Pub. Date: Mar. 21, 2002

(65) Prior Publication Data

US 2003/0135740 A1      Jul. 17, 2003

(51) Int. Cl.
G06F 21/00        (2006.01)
H04N 7/16         (2006.01)

(52) U.S. Cl. ......................................... 713/186; 726/26
(58) Field of Classification Search ................ 713/186; 726/26
See application file for complete search history.

(56) References Cited

U.S. PATENT DOCUMENTS

| | | | |
|---|---|---|---|
| 4,993,068 A * | 2/1991 | Piosenka et al. ............. | 713/186 |
| 5,280,527 A * | 1/1994 | Gullman et al. ............. | 713/184 |
| 5,703,949 A | 12/1997 | Rosen | |
| 5,838,812 A | 11/1998 | Pare, Jr. et al. | |
| 5,862,223 A | 1/1999 | Walker et al. | |
| 6,035,398 A * | 3/2000 | Bjorn .......................... | 713/186 |
| 6,039,248 A * | 3/2000 | Park et al. .................... | 235/379 |
| 6,094,485 A * | 7/2000 | Weinstein et al. ............. | 380/30 |
| 6,107,935 A | 8/2000 | Comerford et al. | |
| 6,141,753 A * | 10/2000 | Zhao et al. ................... | 713/176 |
| 6,151,676 A * | 11/2000 | Cuccia et al. ................ | 713/176 |
| 6,182,076 B1 * | 1/2001 | Yu et al. ....................... | 707/10 |
| 6,202,151 B1 * | 3/2001 | Musgrave et al. ............ | 713/186 |
| 6,401,206 B1 * | 6/2002 | Khan et al. .................. | 713/176 |
| 6,553,494 B1 * | 4/2003 | Glass .......................... | 713/186 |
| 6,850,147 B2 * | 2/2005 | Prokoski et al. ............. | 340/5.53 |
| 6,898,707 B1 * | 5/2005 | Sit et al. ...................... | 713/167 |

OTHER PUBLICATIONS

Daugman, Biometric Decision Landscapes, Jan. 2000, University of Cambridge, pp. 1-13.*

(Continued)

*Primary Examiner*—Kambiz Zand
*Assistant Examiner*—William S Powers

(57) ABSTRACT

A network based mechanism for real time verification and authentication of data and user identities. The present invention enables a method whereby biometric elements, such as voice prints, are utilized to enhance the Public Key Infrastructure as a means to decrypt data and verify data authenticity, such that the user's private key is authenticated remotely on a one-time basis. The present invention comprises an authentication server (25) with various software modules that enable authentication of user identity, secure user access to data, digital signatures, secure messaging and secure online transactions.

26 Claims, 13 Drawing Sheets

OTHER PUBLICATIONS

Juenenman, et al., "Message Authentication", 1985, vol. 23, No. 9, IEEE Communications Magazine, pp. 29-40.*
Jueneman et al., "Biometrics and Digital Signatures in Electronic Commerce", Spring 1998, Jurimetrics, pp. 427-457.*
International Search Report Dated Jan. 3, 2002 From the International Searching Authority Re.: Application No. PCT/US01/27381.
Official Action Dated Apr. 3, 2007 From the US Patent Office Re.: U.S. Appl. No. 10/344,162.
Official Action Dated Aug. 7, 2006 From the US Patent Office Re.: U.S. Appl. No. 10/344,162.
Official Action Dated Oct. 12, 2006 From the US Patent Office Re.: U.S. Appl. No. 10/344,162.
Official Action Dated Sep. 19, 2008 From the US Patent Office Re.: U.S. Appl. No. 10/344,162.
Official Action Dated Feb. 21, 2008 From the US Patent Office Re.: U.S. Appl. No. 10/344,162.
Official Action Dated Sep. 26, 2007 From the US Patent Office Re.: U.S. Appl. No. 10/344,162.
Official Action Dated May 29, 2008 From the US Patent Office Re.: U.S. Appl. No. 10/344,162.

* cited by examiner

How it works

How it works

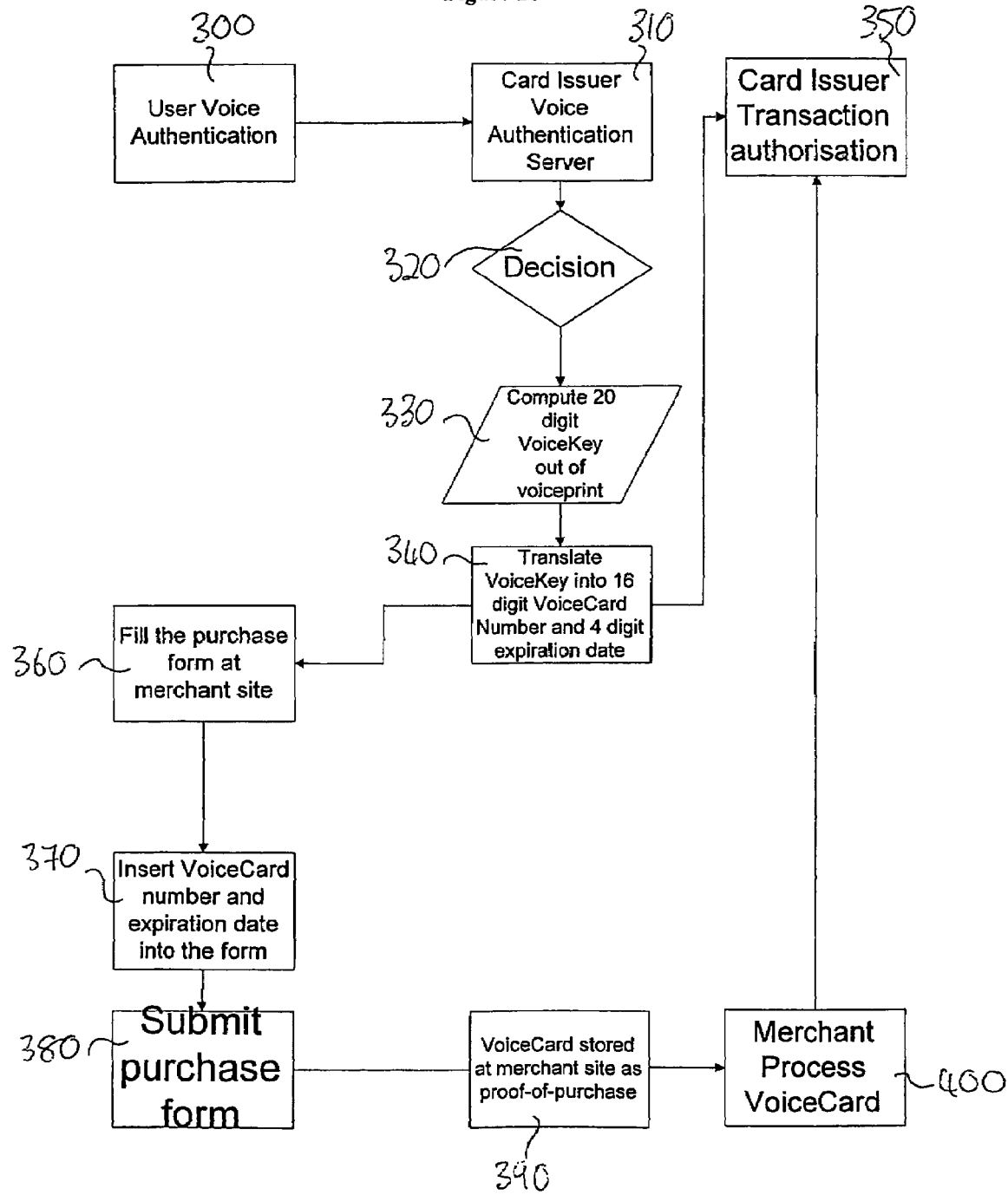

BIOMETRIC-BASED SYSTEM AND METHOD FOR ENABLING AUTHENTICATION OF ELECTRONIC MESSAGES SENT OVER A NETWORK

FIELD AND BACKGROUND OF THE INVENTION

Background of The Invention

1. Field of the Invention

The present invention relates to a system for enabling secure data access and authentication, using biometric means.

2. Description of the Related Art

One of the significant consequences following the substantial development of online commerce and the proliferation of electronic communications has been the passing of the US Federal Legislation (E-SIGN Bill) effective Oct. 1, 2000. This bill confirms that states must allow the use of electronic signatures if the two parties involved agree to this method of signing. According to the E-SIGN Bill, the term "electronic signature means an electronic sound, symbol or process attached to or logically associated with a contract or other record and executed or adopted by a person with the intent to sign the record". The term Digital Signature or Secure Electronic Signature or Advanced Electronic Signature, according to European Union Directive is defined as a digital or electronic method executed or adopted by a party with the intent to be bound by or to authenticate a record, which is unique to the person using it, is capable of verification, is under the sole control of the person using it, and is linked to data in such a manner that if the data are changed the digital signature or electronic signature is invalidated.

The current state of the art in secure data exchange, which satisfies the demands of the "Advanced Electronic Signature", comprises the usage of Public Key Infrastructure (hereinafter referred to as "PKI"). The PKI concept contains the policies and procedures for establishing a secure method for exchanging information within an organization, an industry, a nation or worldwide. It includes the use of certification authorities (CAs) and digital signatures as well as all the hardware and software used to manage the process. PKI involves the use of Private/Public Key pair. Private key is generally some means of identification that is based in the hard drive of a computing device, or is some other physical device, such as a portable disk or smart card. This proves vulnerable since it may be lost or stolen. In addition, users of such means may deny usage of the PKI, in which case it is difficult for second parties/merchants to prove otherwise or know the truth.

The state-of-the-art for sending secure and signed electronic messages using key exchanges includes 3 steps:

1. Encrypting the message using the symmetric key. The same key can be used to decrypt the message.
2. For the authentication of the recipient, the sender encrypts the message plus a symmetric key using the public key of the recipient. The sender may obtain this key online. This key is the asymmetric pair of the private key of the recipient.
3. For the digital signature: the sender digitally signs (encodes) the message or its digest using his/her private key. This key is the asymmetric pair of the public key of the sender.

The state-of-the-art for receiving secure electronic messages includes:

1. The recipient acknowledges the digital signature of the sender using the sender public key. The recipient may obtain this key online.
2. The recipient decrypts the message+symmetric key, using the recipient private key.
3. The recipient decrypts the message using the symmetric key.

There are 3 basic problems with this approach:

1. This approach requires that the sender and recipient look for each others public keys, which represent certain inconvenience and a source of errors. This is mainly because the public keys may be broken and subsequently changed after a certain period of time.
2. The symmetric key is sent with the message, which enables intruders the opportunity to tamper with the keys and message.
3. The most serious problem is that the private key may be stolen. If it stored in the sender computer, and the password protecting it is compromised, then the system is broken in.

In short the major shortcomings of currently-implemented PKI as an electronic signature tool involve the lack of intuitiveness for the user; potential for the user repudiation; cultural acceptance; and the inherent weaknesses of password based security. PKI is based on a "Trust" model that can easily be violated, either deliberately or innocently, since the secret (password) can be transferred.

One of the most common cryptography methods is the Rivest-Shamir-Adleman (hereinafter referred to as "RSA") method. This is a highly secure cryptography method by RSA Data Security, Inc., Redwood City, Calif. This method uses a two-part key, or key pair, such that the private key is kept by the owner and the public key is published. Data is encrypted by using the recipients public key, and the data can only be decrypted by the Recipient's private key. RSA is very computation intensive, thus it is often used to create a digital envelope, which holds an RSA-encrypted DES key and DES-encrypted data. This method encrypts the secret DES key so that it can be transmitted over the network, but encrypts and decrypts the actual message using the much faster DES algorithm. RSA is also used for authentication by creating a digital signature. In this case, the sender's private key is used for encryption, and the sender's public key is used for decryption.

Existing attempts to authenticate data and users include the following:

Digital signature, which refers to a digital guarantee that a document has not been altered, as if it were carried in an electronically sealed envelope. The "signature" is an encrypted digest of the text that is sent with the text message. The recipient decrypts the signature digest and also re-computes the digest from the received text. If the digests match, the message is proved intact and tamper free from the sender.

Digital certificate is the digital equivalent of an ID card used in conjunction with a public key encryption system. Also called "digital IDs," digital certificates are issued by a trusted third party known as a certification authority (CA), after verifying that a public key belongs to a certain owner.

The digital certificate is actually the owner's public key that has been digitally signed by the CA. The digital certificate is sent along with an encrypted message to verify that the sender is truly the entity identifying itself in the transmission. The recipient uses the public key of the CA, which is widely publicized, to decrypt the sender's public key attached to the message. Then the sender's public key is used to decrypt the actual message.

In spite of these digital signature and digital certificate methods, the limitations of public key-based encryption solutions are evident, such as the vulnerability of the CA's private key, which is used to digitally sign a public key and create a certificate. If the CA's private key is uncovered, then false digital certificates can be created, and identities may be stolen.

There is a clear need for digital signatures and certificates to incorporate a means for accurately establishing the identity of an actual user of a system. An example of means that enables identity authentication is U.S. Pat. No. 5,913,196, which describes a "System and Method for Establishing Identity of a Speaker". This patent, which is fully incorporated herein by reference for all purposes as if fully set forth herein, describes a system for establishing an identity of a speaker, and includes a computerized system that comprises at least two voice authentication algorithms.

There is thus a widely recognized need for, and it would be highly advantageous to have, a system and method that can enable higher-level secure access and authentication of users and data, without relying on the vulnerable private key in the PKI system.

Furthermore, similar problems exist in the field of identity authentication for online transactions, especially related to the usage of credit cards. The current state-of-art credit card protection means include:

1. Deactivation of the credit card number by the user, and activation initiated by the user.
2. Use of bogus (one-time) credit numbers, which are sent to the merchant and issuer. The bogus number arrives at the merchant with the transaction, and is then sent to the issuer clearing house, where it is replaced with the actual credit card number.

Appletix Inc. (245 Park Avenue, 24th Floor New York, N.Y. 10167) provides a technology that attaches a virtual credit card number to a transaction, as soon as a consumer commits to a purchase and is authenticated by the issuer. This number identifies the transaction throughout the rest of the payment process. The number is sent to the consumer's PC and is automatically inserted in the payment form. The form, encrypted with Secure Sockets Layer (SSL) security protocol means is then sent to the merchant. The merchant processes the transaction and sends it to its acquirer, which returns the transaction to the issuer. Only when the transaction returns to the issuer does the Appletix system convert the virtual number to the consumer's actual credit card number. Throughout the process, the consumer's card number never crosses the Internet, and never leaves the card issuer's site.

Cyota Inc. (1350 Avenue of the Americas, Suite 2015 New York, N.Y. 10019) provides a technology whereby when a customer with a participating credit card makes an online purchase, the SecureClick system replaces the customer's real credit card number with a one time, disposable, transaction number. Only this number is sent to the merchant and in turn to the issuer for authorization. SecureClick then links it back to the real credit card number so that the issuer can complete the payment process as usual.

The current state-of-the art reveals the following problems:

i. The access to "bogus number programs" is password protected, and is therefore vulnerable to theft, thereby compromising credit card security.

ii. The merchant receives bogus numbers from the user. If the user denies the purchase, there is no proof of purchase at the merchant site, and this may result in customer repudiation.

Therefore the need exists to provide more robust protection for credit-card number protection for the user and proof-of-purchase for the merchant, without changing the existing credit-card transaction infrastructure (i.e. without installing additional software at the merchant site).

SUMMARY OF THE INVENTION

According to the present invention there is provided a system for verifying and authenticating data and the identity of the sender of the data in real time. In particular, the present invention enables a three-tier security method whereby unique PIN, computer identity number and biometric data, such as voice, improve the Public Key Infrastructure (hereinafter referred to as "PKI") as a means to verify data.

By using real time signature verification in lieu of the password for the private key, the main weaknesses of PKI are addressed, including the lack of an intuitive interface, wherein the "act" of signing is missing, and the vulnerability of the password. In addition, the Voice Authentication solution benefits from the high encryption needed for secure transmissions of the document or form. This is an extremely secure model and perhaps the security redundancies exceed the needs of most e-signature applications.

The technology of the present invention uses the behavioral biometrics (such as that of Voice Authentication) to verify the identity of the user. In this example, the unique voice qualities of each individual (hereinafter referred to as a "Voice print") is collected and then bound to a digitally signed document. This meets the requirements for ensuring that the electronic signature is unique to the person using it. The Voice print, once entered, cannot be altered or copied, and is encrypted and stored as part of the record. This satisfies the condition of "under the sole control of the person using it".

The technology of the present invention ensures that the no tampering condition is satisfied, by invalidating the signature if the document is altered. If any data in the document is altered after the person signs it, the technology will keep a permanent record of the tampering, and provide a clear audit trail. The integrity of the document is insured using a Hash Algorithm (such as MD5, RSA, SHA-1 or RC4) as well as strong encryption.

Accordingly:

1. The sender and recipient do not use each other's public keys, and, in fact, no public keys are used at all. In place of this, the server performs the public servant or Business Registrar function.
2. The symmetric key is sent to the server of the system, separately from the message, in order to prevent tampering.
3. The private keys are replaced by biometric data from the sender and the recipient (such as Voice prints), and as such cannot be lost, stolen or compromised.
4. The present invention may optionally verify the data authenticity, such that if the data changed since being sent, the digital signature is invalidated.

The present invention can be used by someone to authenticate the identity of the message sender and/or of a user. It can also be used to ensure that the original content of the message or document that has been conveyed is unchanged.

The present invention includes the following components:

i. At least one network enabled client device for sending data to a network.

ii. At least one biometric data input mechanism on the client device, for capturing biometric data.

iii. An authentication server for enabling real time data authentication, both at the authentication server and the client device sides.

The execution of the present invention comprises the following steps:

1. Secure Biometric Remote Registration Procedure, for enabling secure registration to an authentication server,
2. Using the secure access module SAM to enable Secure Access to data, by enabling biometric matching between the registered Voice print and the Voice print being currently recorded.
3. Using the digital signature module DSM as a Business Registrar, to enable verification of digital signatures.
4. Using the secure messaging module SMM to enable Secure Messaging.
5. Using the secure transaction module STM to enable Secure Credit Card and other E-Commerce transactions.

ADVANTAGES OF THE INVENTION

The present invention provides the following innovations:
1. Triple-layer authentication solution is based upon a two-tiered digital layer plus an additional biometric voice authentication layer.
2. Extra security level by adding signed file encryption and recipient voice authentication
3. Can be used for securing files and documents on laptops and PCs as well as a secured e-mail solution.
4. Makes use of a unique biometric feature—your voice is your key—it cannot be stolen, there is no need to protect it with passwords or on smart cards and yet it's always with you.

BRIEF DESCRIPTION OF THE DRAWINGS

The invention is herein described, by way of example only, with reference to the accompanying drawings, wherein:

FIG. 16 illustrates an example of the secure transaction process.

DESCRIPTION OF THE PREFERRED EMBODIMENT

Figure 1:
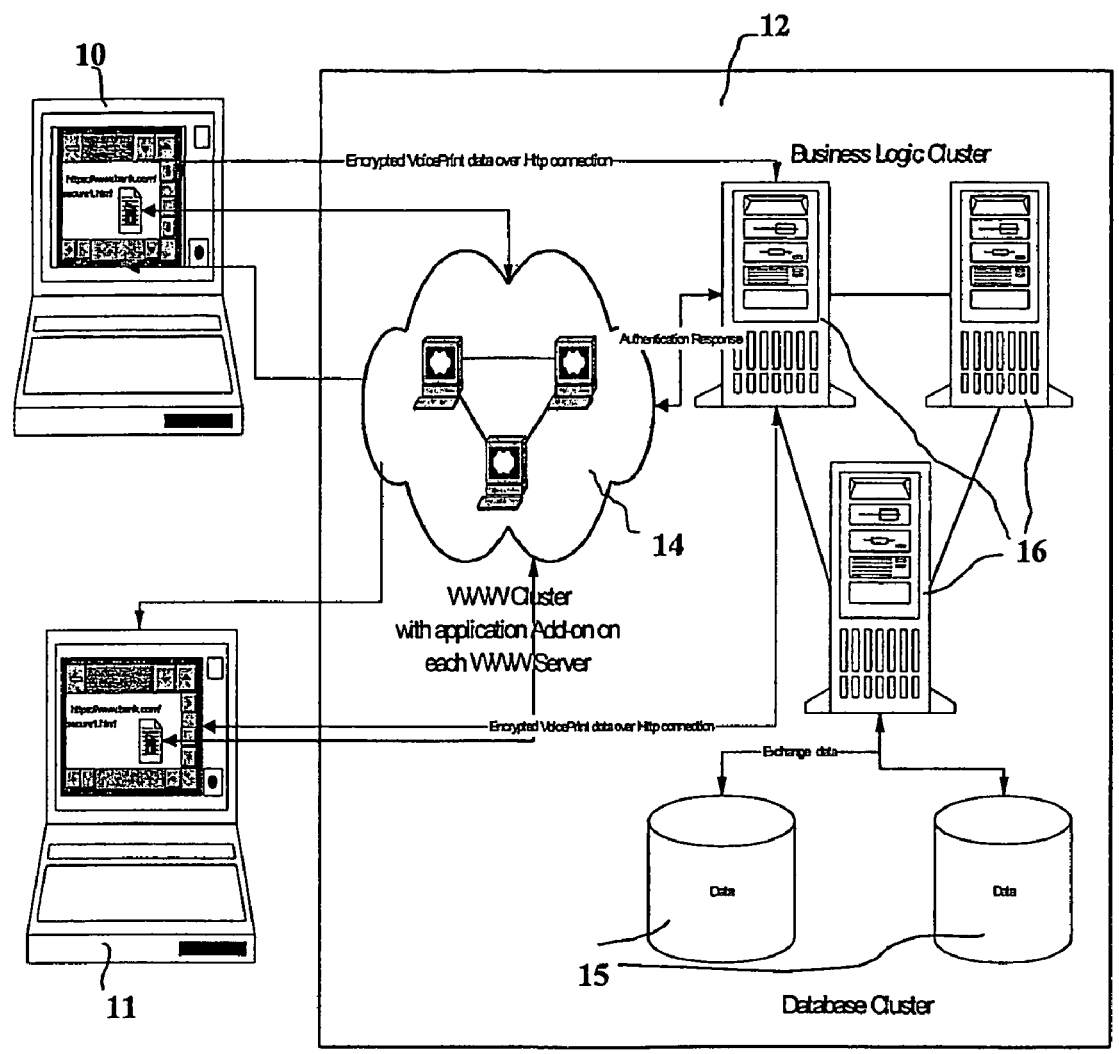
FIG. 1 is an illustration of the components according to the present invention.

The present invention relates to a system and method for enabling secure access to data sent over a network, and verifying and authenticating the data and the identity of the sender of the data, authenticating the recipient of the data, and securing on-line transactions.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Specifically, the present invention uses a three-tier security mechanism to verify data and user authenticity in real time, and to ensure that access to the data is allowed to chosen parties only. This includes a PIN number, a PC identity number and a unique biometric (such as voice) signature. This biometric signature, which refers to the biological identification of a person, includes eye features, Voice prints, handprints, fingerprints, face images, hand-written signatures and any other biologically based means of identification. These unique biometric features replace the permanent private key required by the PKI system. Biometrics are a more foolproof form of authentication than typing passwords or even using smart cards, which can be stolen, as they are unique and are always with the user.

The real time data and user authentication, according to the present invention, refer to the one-time authentication procedures, whereby users and/or data are re-authenticated for each session, and such that the re-authentication procedure is processed online, within a small time frame. This can be compared to a person going to a bank for a new one-time ATM password, such that he/she will need to go to the bank for the new password each time he/she wants to draw money. The present invention automates and enabled an equivalent remote procedure whereby the user can remotely receive such a password on a one-time or real time basis, using a biometric sample.

Although the following description details the authentication of data and users based on a voice authentication technology, the present invention is not limited to such an execution, and may incorporate alternative biometric technologies to provide such authentication.

Bruce Schneier, a Security expert from Counterpane Corp, wrote in his article "The Uses and Abuses of Biometrics," *Communications of the ACM*, August 1999, Vol. 42, No. 8, p.136, that traditional biometric identification systems require two conditions:

1. Real-time verification. In other words, biometric information is submitted by the user at the time of verification.
2. The biometric has to match a user biometric that is located in a master biometric file.

If a biometric verification system couldn't follow this paradigm—it was bound to fail. Schneier also points out that the majority of biometric information is not necessarily secret.

Signatures, fingerprints, and iris patterns are obtainable by anyone who is so inclined, or a biometric file can be stolen. In each of these cases, security is irrevocably compromised. It is clear that these types of biometric information can not function as a "house key", because biometric information in a file is not random or secret, and cannot be changed, updated or destroyed at will.

However, the Voice Authentication application of the present invention functions just like a "house key" because this kind of biometric information is random, interactive, and replaceable, and if the need arises, the biometric information can be destroyed altogether.

1. The sender and recipient do not use each other public keys, and in fact, no public keys are used at all. In place of the public keys, the server of the present invention (hereinafter referred to as the "authentication server") performs the public servant function, by being located between the sender and recipient, storing the crucial information, and executing the user verification procedures.
2. The symmetric key is sent to the authentication server of the system (from the sender), separately from the message, in order to prevent tampering. Since the message and key are not sent together, the possibilities of deciphering the encryption codes between them are minimized.
3. The private keys are replaced by sender and recipient biometric data (such as Voice prints), and as such cannot be lost, stolen or compromised.
4. The present invention may optionally verify the data authenticity, such that if the data changed since being sent, the digital signature is invalidated. This is achieved by executing a hash calculation, and comparing the calculation with originally sent Hash value.

Detailed Description of the Parts

The principles and operation of a system and a method according to the present invention may be better understood with reference to the drawings and the accompanying description, it being understood that these drawings are given for illustrative purposes only and are not meant to be limiting, wherein:

According to the present invention, as can be seen in FIG. 1, the following components are integral:

1. Hardware:
i. At least one network enabled client device 10 for sending data to a network, wherein the client device may be a PC, notebook, PDA, smart phone, cellular phone, wearable computer, gadget, communications device or any other Internet/intranet compliant computing or communications device.
ii. Each client device requires an appropriate data input mechanism on/in the client device, for enabling biometric data input/capture. For example, a sound card or Sound Device on the computer motherboard, and a microphone (with headphone, clip-on etc.), for enabling audio input and output. Another example is a microphone which is built in to a cellular phone.
iii. A server component 12, referred to hereinafter as the Authentication Server, for enabling the functions of: registration and authentication, secure access verification, digital signature verification and secure messaging, and secure transaction enabling. The Authentication server 12 includes a web-server component 14 for serving HTTP requests, at least one database 15 for storing system data, and a Business Logic (Java language decision) application 16 for enabling matching between biometric data to be verified and stored biometric data.
iv. optionally, at least one additional network enabled device 11 for receiving data, such that the client/host devices may be a PC, mainframe, notebook, PDA, smart phone, cellular phone, wearable computer, gadget, communications device or any other Internet/Intranet compliant computing or communications device.

2. Software:
i. Internet browser software for client devices, with for example a 128-bit length key (cipher strength). The cipher strength can be changed according to the security needs.
ii. A system comprised of a plurality of software modules, for providing data and digital signature authentication. Each module has one-part at the client-side and another part on the server side, including:
a. a module, hereinafter referred to as a "secure registration module" or "SRM", for providing a mechanism and graphic user interface for enabling safe registration of users to the system.
b. a module, hereinafter referred to as a "secure access module" or "SAM", for providing a mechanism and graphic user interface that enables Voice Authentication at the authentication server and the clients. The secure access module has a triple layered structure that provides rock solid data access security.
c. An optional module, hereinafter referred to as a "digital signature module" or DSM, for providing a mechanism and graphic user interface for enabling digital signature authentication.
d. An optional module, hereinafter referred to as a "secure messaging module" or "SMM", for providing a mechanism and graphic user interface for enabling secure messaging between senders and receivers of online messages.
e. an optional module, hereinafter referred to as a "secure transactions module" or STM, for providing a mechanism and graphic user interface for enabling a secure online transactions.

Detailed Description of the Process According to the Present Invention

Figure 2:
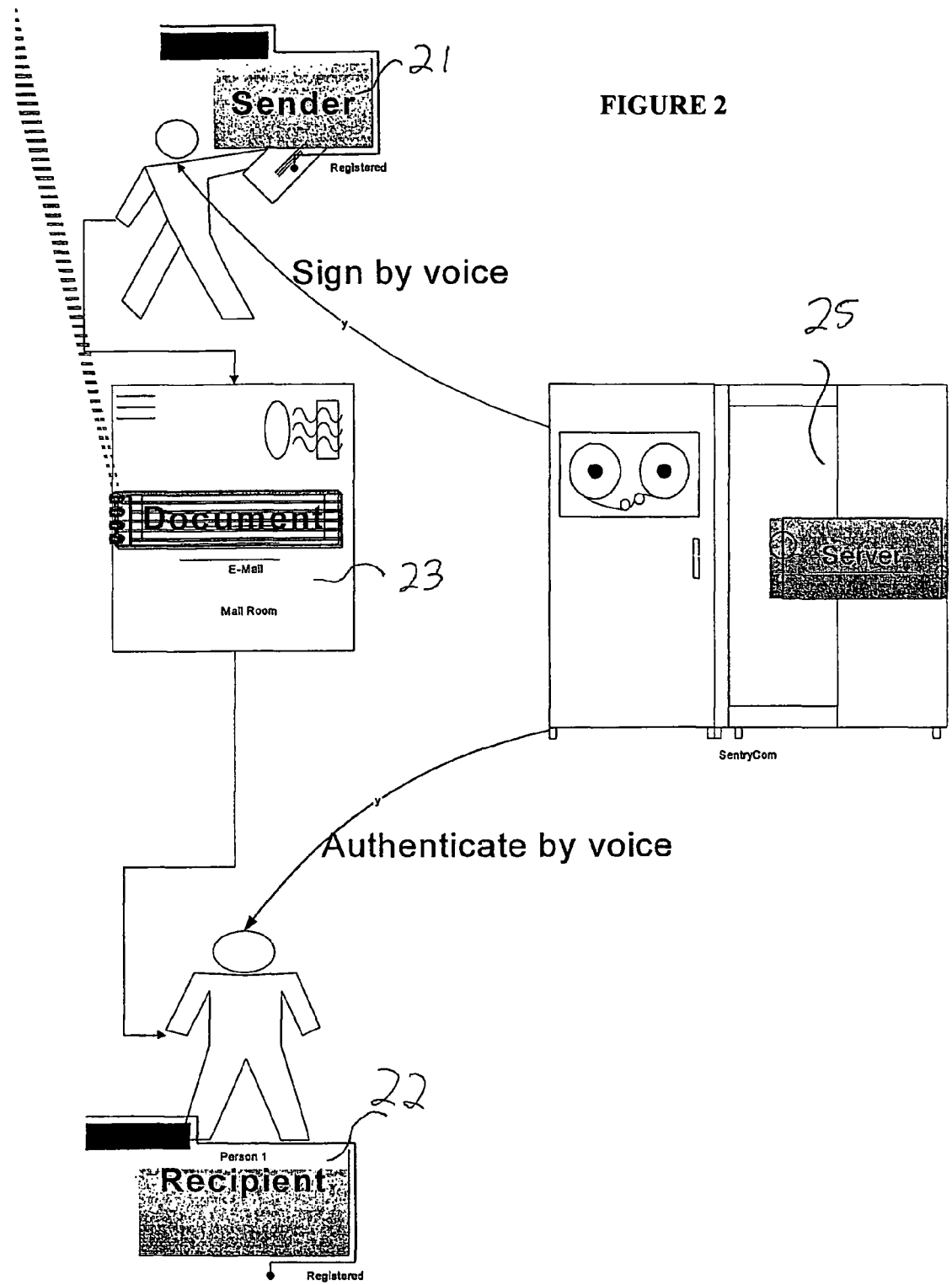
FIG. 2 is an illustration of the basic business process, according to the present invention.

The present invention enables the authentication of identities and enabling of secure data access. Optionally, the present invention also enables digital signature verification and secure message transfers, as well as secure transaction provision. As can be seen in FIG. 2, a secure data exchange occurs between two parties, referred to in the figure as Sender 21 and Recipient 22. According to the present invention, the main data, such as the document 23, is sent directly to the other party, while data for authentication purposes passes to the users via the authentication server 25. The authentication server 25 processes the biometric data and executes the necessary steps to ensure authentication of the user and data. The main document is encrypted and the key to open it is sent via the authentication server 25, such that the document can only be opened after the user is authenticated by the authentication server 25.

The processes carried out by the authentication server 25, according to the present invention, are as follows:

1. Secure Biometric Remote Registration Procedure, executed by the secure registration module (SRM) comprises:
  i. registering personal details with server 25.
  ii. registering a biometric characteristic (such as a Voice print) with server 25.
  iii. receiving a secret number (PIN-Personal Identification Number) by email.

2. Secure data access procedure, wherein the secure access module (SAM) enables user authentication and provides a token to access an application or information.

Secure Access procedure:
  i. login using PIN+computer device ID+voice print
  ii. verification of user/signer/recipient/person performing transaction online in real time, by comparing login with registered information.

3. Digital signature verification procedure, provided by the digital signature module (DSM) for optionally enabling digital signature verification, provides Business Registrar services and enables authentication of:
  i. the actual sender and time-stamp of the data.
  ii. the data authenticity (that no changes have been made to the original data).
4. Secure Messaging verification procedure, provided by the Secure Messaging module (SMM), for enabling secure messaging between parties.
5. Secure transaction procedure, wherein the secure transactions module (STM) enables secure transactions between parties.

1. Secure Biometric Remote Registration Procedure

This procedure has the following objectives:
  1. To provide the system administrator (the administrator of the Authentication server 25) with a tool for seamless synchronization between old authentication means such as "username", and a new authentication means such as "biometrics".
  2. To provide a means for enabling the secure registration of biometric information in order to prevent identity theft (registration of an unauthorized person).
  3. To provide a monitoring tool for remote registration i.e. the user is not requested to be physically present at the administrators office, One of the major problems of biometrics is the need to register biometric samples. The mere process of biometrics registration opens the door of attack. For example, the criminal may steal the personal and financial information of the user ("user identity", register his/her voice or fingerprint instead of him/her, and steal without being caught). The present invention describes a way of secured registration of biometric registration.

Registration with a Biometric Authentication Service Provider (Hereinafter Referred to as the "Authentication Server").

In order to prevent a criminal attack on personal information, the biometric registration is NOT attached to the personal ID (such as Social Security number etc.). On the contrary, the PIN (personal identification number) is attached to the biometric pattern of the person that is subsequently registered. The difference from known systems is that the registration is initiated by the administrator and not by the user. If biometric registration would be assigned to personal ID then a criminal could be register his/her biometric info to other persons ID, thus "stealing" his/her identity. According to the approach of the present invention, the PIN is assigned to the actual "holder" of biometric information. Therefore the possibility of stealing an ID is minimal.

In order to register as a user of the system of the present invention, the user initially registers basic personal information using the system's Website (supported by the Web server component of the authentication server. After this initial registration and checking of user credentials, the system administrator sets up, for example, the following database:

| Gender | First Name | Last Name | E-mail | One-time | Username | Biometric data |
|--------|-----------|-----------|--------|----------|----------|----------------|
| Mr | Jim | Jones | jones@acme.com | 43243243765 | JimJones | 0101010111 |

The personal information of the user is known to the administrator. The column 6 (username) represents the existing means of authentication for the user above. The One-Time ID is a randomly generated number used by the above user to perform biometric registration. This one time ID is sent to the user, to the E-mail address above specified. If the user credentials include a Digital Certificate on the user's computer, then this E-mail message can be encrypted with his or her Public Key.

Once the user receives the E-mail, s/he can perform the entire Biometric Registration, by providing the fields (columns) 1-5. Following this, when requested, the user can register a biometric sample, such as a Voice print, which is entered by speaking into a voice input mechanism (such as a microphone) guided by prompts from the system. Once the registration is complete, PIN number is sent to the user at the above-specified E-Mail address. The PIN remains unknown to the administrator.

The Biometrics database includes the unique person identifier fields (columns) 1-4. Since the PIN is insufficient for unique identification, a unique network identity number of the computing device (hereinafter referred to as "PCID") is assigned to the computer during the registration process. This number is added so that the combination of PCID and PIN becomes a unique identifier.

PCID is a software key generated by a Registration Server. It can be linked to the hardware keys of the PCs, such as network IDs, hard-disk IDs, smart cards etc. PCID is an integer assigned to each unique computer, for example, on an incremental basis, such that the first computer gets 1, the second computer gets 2, etc. This number is written to the computer Registry. Therefore any user registered on the same computer will have the same PCID, but a different PIN.

The Biometrics database also includes a field (column 5), which is the username. If authentication is successful, then this field is sent to the required application, for example a Web Server, to provide privileged information. In this way, the stored privileges (based upon username) can be used to access the confidential and personal data.

If the user needs to register again (because of a hardware failure or need to access from other PCs), a new one-time ID is generated and the process is repeated.

Additional Registration and Roaming Access:

In the case where users would like to access a protected database or access a protected document from multiple stations (home, office, travel etc.), roaming access refers to using biometric access means, without requiring pre-installed hardware. An example of such a system is using a cellular phone as the means of biometric authentication, using Speaker Verification. In such a case, the user must pre-register his/her Voice print. In this case PCID is replaced by cellular phone # (this number is read using standard Caller ID). In case that the roaming device (such as PDA) uses any other network identifier such as IP address, this parameter can be used as well.

Since any type of authentication technology includes hardware and software—the user has to be able to install both or use pre-installed software on his/her hardware device.

The user therefore informs the system that he/she wants to "enable new registration". S/He can ask his system administrator to get another one-time ID, and then register on a new PC/computer or communications device (that has all the hardware needed, such as a voice input mechanism etc.). The user enters: First Name, Last Name, E-mail, New one-time ID. Another choice is to choose a roaming option. This is enabled by first authenticating the user and then creating a roaming diskette. The diskette contains hardware and software IDs required. The user carries the necessary hardware (microphone) with him/her, which can be connected to the desired hardware computing device. In this situation, for example, any computing device with diskette facilities may be used. The user may therefore perform authentication on any PC or computing device, without performing additional registration.

Another problem lies in stealing registration information and replacing the biometric data with illegitimate biometric data of the intruder/criminal. In order to solve this problem, the following action is performed:

A compressed representation of stored information is calculated, using a method such as Cyclical Redundancy Checking (hereinafter referred to as "CRC"). CRC refers to an error checking technique used to ensure the accuracy of transmitting digital data. The transmitted messages are divided into predetermined lengths which, used as dividends, are divided by a fixed divisor. The remainder of the calculation is appended onto and sent with the message. At the receiving end, the computer recalculates the remainder (RC). If it does not match the transmitted remainder, an error is detected. This representation of the stored biometric information is stored in the registration database. This representation is sent to the relevant Administrator monitor at the start of every authentication session. If the stored information is altered at the Biometric Authentication Service provider, this will be detected and the administrator will be notified.

The voice verification technology that identifies the actual Voice prints and claims very high accuracy, is defined in U.S. Pat. No. 5,913,196, which is fully incorporated herein by reference.

2. Using the Secure Access Module (SAM) to Execute Secure Data Access

An example of a system that securely authorizes a user to access a secure site is U.S. patent application Ser. No. 09/526, 088, which describes a system and method for authorizing a user to access a secure site, and which is fully incorporated herein by reference for all purposes as if fully set forth herein.

Figure 3:
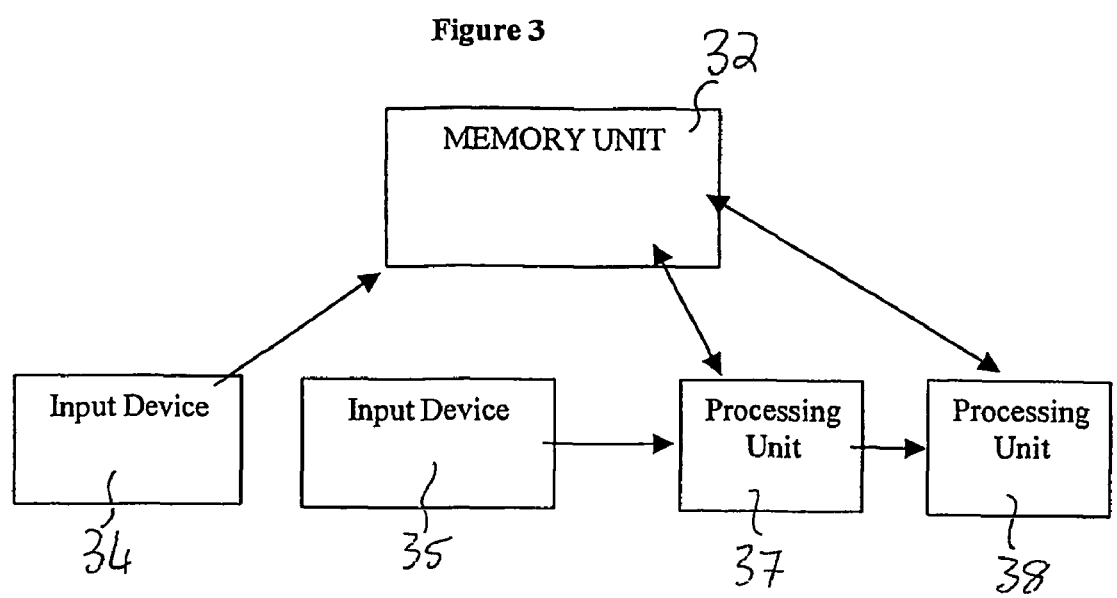
FIG. 3 illustrates the components of the Signature Authentication Module.

As seen in FIG. 3, this module comprises a memory unit 32 for storing information including a stored voice print and an identity of each of a plurality of individuals; a first input device 34 for inputting user information; a second input device 35 for inputting temporary voice data; a first processing unit 37 for generating a temporary voice print generated from the temporary voice data inputted by the user via the second input device 35; a second processing unit 38 for comparing the temporary voice print received from the first processing unit 37 to the stored voice print of each of at least a portion (or all) of the individuals stored in the memory unit 32.

A method, that uses the above module, is provided for authorizing user access to a secure site, including the following processes:

A user self identifies to the system. Following this, a temporary voice data input is collected, such that the various voice features are extracted and processed, so as to generate a temporary voice print. A distortion metrics is calculated between the temporary voice print and each stored voice print in a voice print database. Each stored voice print is generated from previously inputted voice data of an individual of known identity. A stored voice print which has a minimal distortion as compared to a temporary voice print is found, and the identity of the specific individual corresponding to the specific stored voice print is ascertained. If the identity of this individual coincides with that claimed by the user, then authorization is accepted.

In a preferred embodiment of the SAM module, a system and method is described that enables the secure access of a Web site, such as, for example, an E-commerce Web site.

Figure 4:
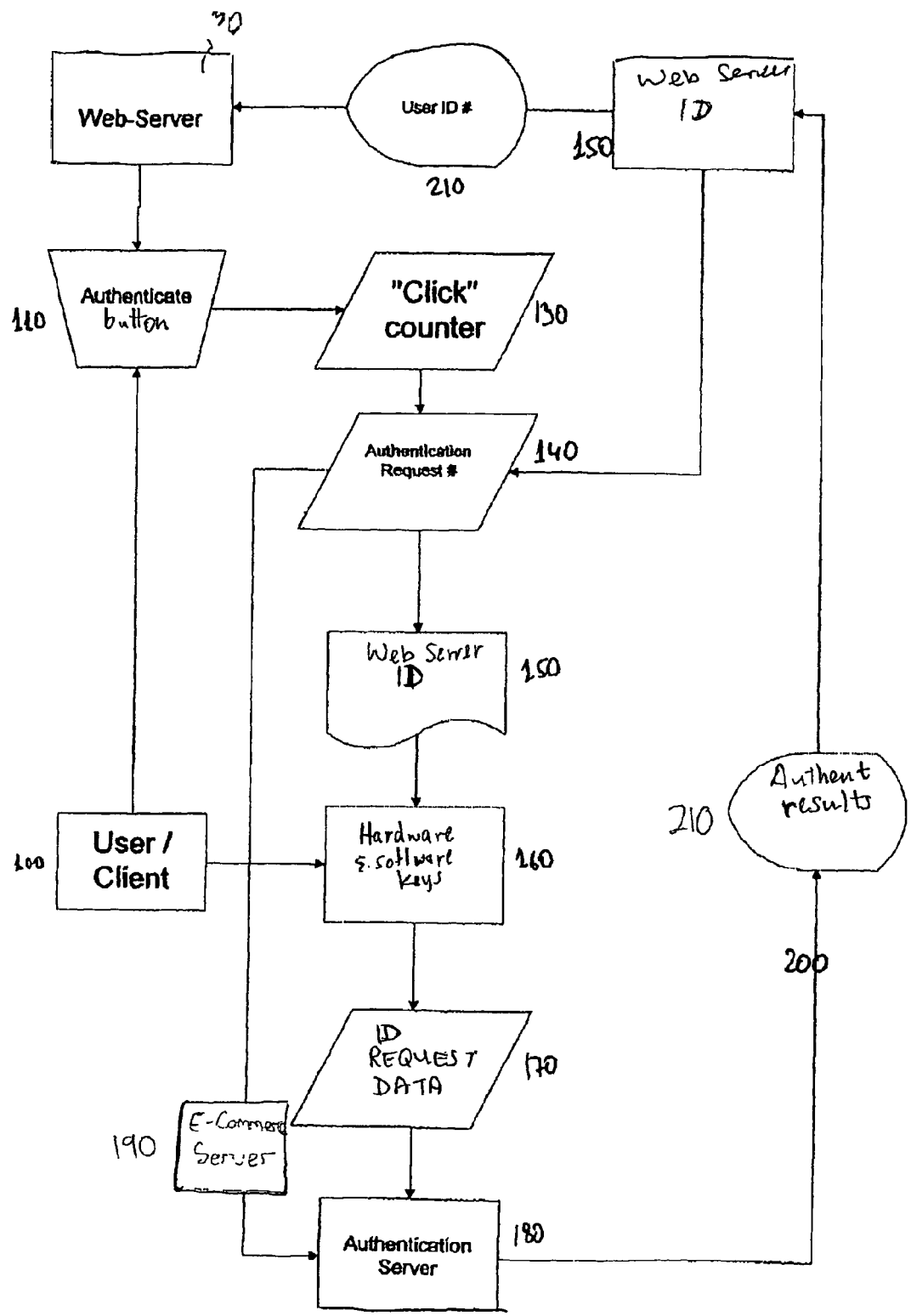
FIG. 4 illustrates the process whereby users are given secure access to a Web site.

Thus, as shown in FIG. 4, a user operating a user client 100 enters a Web page stored on a Web server 120 and initiates user authentication, by activating and authentication button 110. A click counter 130 generates and authentication request number 140. An E-commerce server 190 communicating with, or integrated into, a Web server 120, bundles the authentication request number 140, a number 150 identifying a Web server 120 (for example, an IP address), user provided voice data (for authentication) and hardware and software keys 160 and communicates this information as an ID request data 170 to an authentication server 180 which is in communication with the Web server 120. The authentication server 180 processes the data 170 received thereby and returns 200 authentication results to the Web server 120 via the E-commerce server 190. The authentication results 210 are then displayed on the Web page accessed by the user.

The data access privileges of the Web Server such as Internet Information Server (IIS) is generally linked to a username. If the username during domain login matches the privileges in the file, the user will gain access to the data required. In order to link to the privileges, SAM transfers to the IIS the "token" of the username.

After completing the simple registration of section 1, the user is ready to use SAM. This includes a two-tiered digital layer that incorporates an easy-to-remember four digit PIN, which functions as the access ID and user-transparent PC ID (or other network identifier).

The additional biometric voice authentication layer effectively links the three layers together to create a triple-layered voice authentication access system. The Voice Authentication Layer has the following features:

SAM uses random, real-time prompting, precluding the use of tape-recorded voice data of true users by unauthorized users to access the system.

Although the initial voice registration should take place in quiet surroundings, SAM successfully achieves user identification and authentication in noisy office environments. SAM successfully achieves user authentication unless the user is very hoarse.

3. Providing Digital Signature Authentication (Business Registrar Services) Using the Digital Signature Module (DSM)

The present invention, through a software module, referred to hereinafter as "digital signature module" (DSM), allows the user to perform the act of signing a digital signature on an electronic message (file) of any kind, in compliance with Digital Signature law. DSM is a software application program, managing voice-sealing (or unsealing in case of recipient) operation. The document together with its hash digest is dynamically encrypted (or decrypted in case of recipient), using the voice signature password of the present invention. The major advantage of DSM over PKI is that no Private Key is stored on user's computer. This solves the problem of non-repudiation, namely the ambiguity surrounding the actual usage of this Private Key, and the ability for the sender of a message to deny his/her role in sending the message or initiating the transaction.

DSM utilizes client-server architecture. The client combines Voice Digital signature with Microsoft CAPI (Crypto API). The server prevents any possibility to forge the Digital Signature at the client side, without first performing Voice Authentication at the server side. The Digital Signature law links the person's signature with the message integrity. The message integrity check represents the vital part of the application.

If any data in the document is altered after the person signs it, the technology will keep a permanent record of the tampering, and provide a clear audit trail. The integrity of the document is insured using the Hash Algorithm (such as MD5, RSA, SHA-1 or RC4) as well as strong encryption. This feature ensures that if the data is changed, the digital or electronic signature is invalidated. The "Hash" is simply a "summary", or "tag" (hereinafter referred to as "Hash Digest"), which is generated from a digital document using a mathematical rule or algorithm. It is designed so that a small change in the document would produce a big change in the hash digest. Hashing algorithms are "one-way", in that you can create a hash from a document, but you cannot recreate the document from a hash. A hash is not an encryption of the document. Most importantly, it is very difficult to find two documents that have the same hash. Hashes are used to check the integrity of files and documents, and are also often used in digital signature algorithms. This is because a small change in the document (like changing US$100000 to US$1000000) would produce a completely different hash. The present invention preferably uses Microsoft CryptoAPI from Security SDK implementing MD5, RSA, SHA-1 or RC4 etc. hashing algorithms.

The MD5 algorithm, for example, takes as input a message of arbitrary length and produces as output at least a 128-bit "fingerprint" or "message digest" of the input. It is conjectured that it is computationally infeasible to produce two messages having the same message digest, or to produce any message having a given pre-specified target message digest. The MD5 algorithm is intended for digital signature applications, where a large file must be "compressed" in a secure manner before being encrypted with a private (secret) key under a public-key cryptosystem such as RSA or PGP ("Pretty Good Privacy", which is Public key cryptography software from Pretty Good Privacy, Inc., San Mateo, Calif.

Therefore, according to the present invention, the message of arbitrary size produces as output at least a 128-bit Hash Digest. If the received message has been tampered with then the Hash Digest will not match the original message Hash Digest. It is computationally infeasible to produce two messages having the same Hash Digest. Microsoft CAPI generates private/public key pair to seal/unseal the Hash Digest Since no public key is stored with the message, the server prevents any possibility to forge the Hash Digest at the client side.

Figure 5:
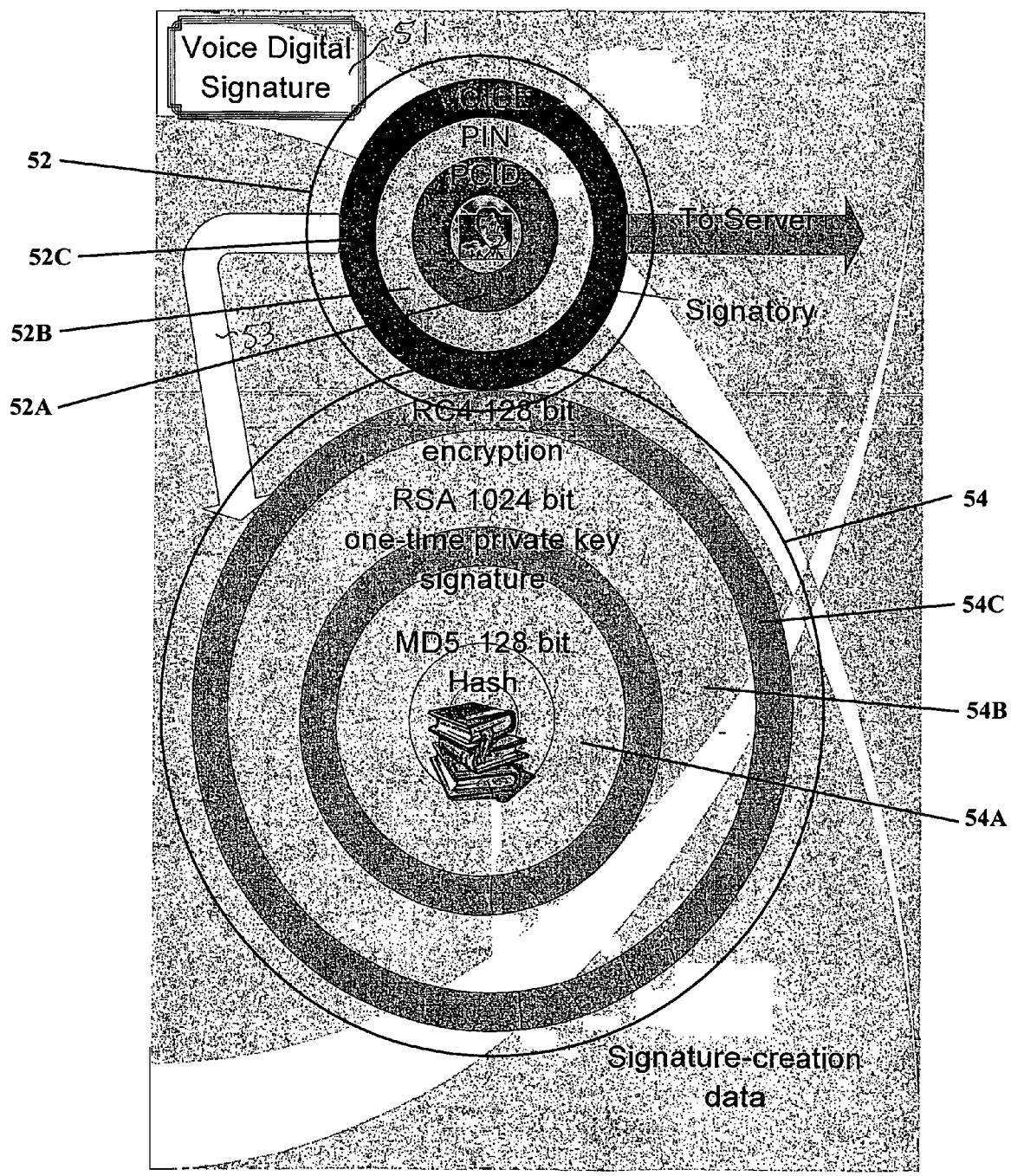
FIG. 5 illustrates the signing of a document according to the DSM module.

According to the present invention, a "Request#" is a number identifying an authentication session to the Server of the present invention (referred to as the "Authentication Server"). As can be seen in FIG. 5, each time a document is voice signed 51, the sender (the signatory) performs a Voice Authentication session with the Authentication Server. The Authentication Server connects the Request# from this session to the clients biometric key 52, which is comprised of the user's PCID 52A, PIN 52B, and Voice print 52C. The DSM module in the authentication server receives this Request# as a number identifying the present signing session. The DSM module sends the Request# as a token to the sender 53 client software), to initiate a signing session using Signature-creation data 54, for example, Crypto API. Optionally, signature-creation data 54 relies upon one or more of RC4 128 bit encryption 54C. RSA 1024 bit one time private key signature 54B and MD5 128 bit Hash 54A.

According to the present invention the "Private/Public encryption key pair" is preferably provided by Crypto API RSA algorithm, which executes private key sealing and public key unsealing the Hash Digest, computed out of a document. The RSA algorithm success is based on the difficulty of factoring large prime numbers. The Microsoft Enhanced Cryptographic Provider (which comes with the crypto API and provides stronger security than a default CSP with the same set of functionality) consists of a software implementation of the PROV_RSA_FULL provider type. The one-time private key is used to digitally sign and seal Hash Digest. The Public Key, which is used later to un-seal Hash Digest is sent to Authentication Server in format of encrypted KeyBlob of at least 1024 bits length.

Use of biometrics enabling a one-time private key instead of password-protected stored private key is much more secure and provides a major improvement over state-of-the-art PKI.

The "Session encryption key" is computed out of authenticated signer's voice print password, encrypting and decrypting the whole document envelope. Session encryption key is an output of CryptoAPI, incorporating RC4 symmetric-key encryption algorithm. The RC4 encryption algorithms are implemented with a key length of at least 128 bits. The DSM application implements encryption using RC4 algorithm. The Voice print Password has a length of at least 256 Bits, generating a Session key of at least 128 bits. The use of Session Key generated out of VoicePrint Password causes the encrypted (digitally signed) file to include (to attach) the Biometric signature (i.e. electronic signature generated out of biometric sample). This may be useful in the cases were dispute between the parties (sender, recipient and Business Registrar) may arise.

The server allows the performing of Business Registrar (Transaction Certificate Authority) functions, wherein every transaction can be tracked down at any time, according to the request numbers. When a recipient opens a digitally signed message, a certificate is received online from the server.

Figure 6:
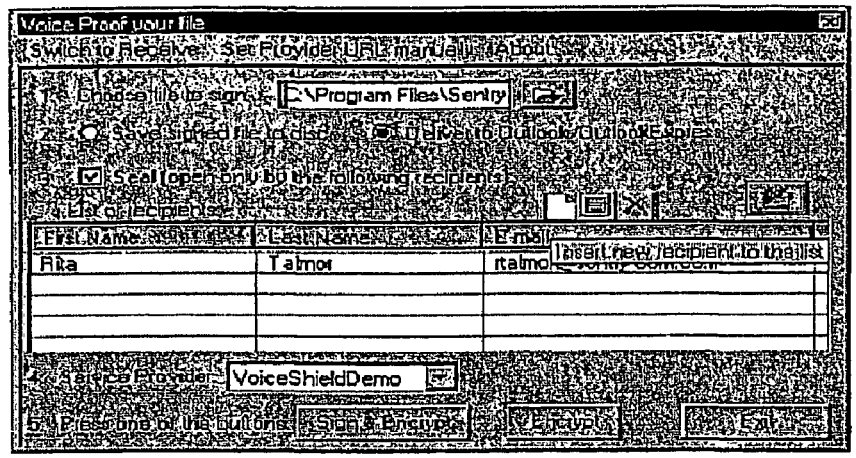
FIG. 6 illustrates the voice signing of a document, using the DSM application.
Figure 7:
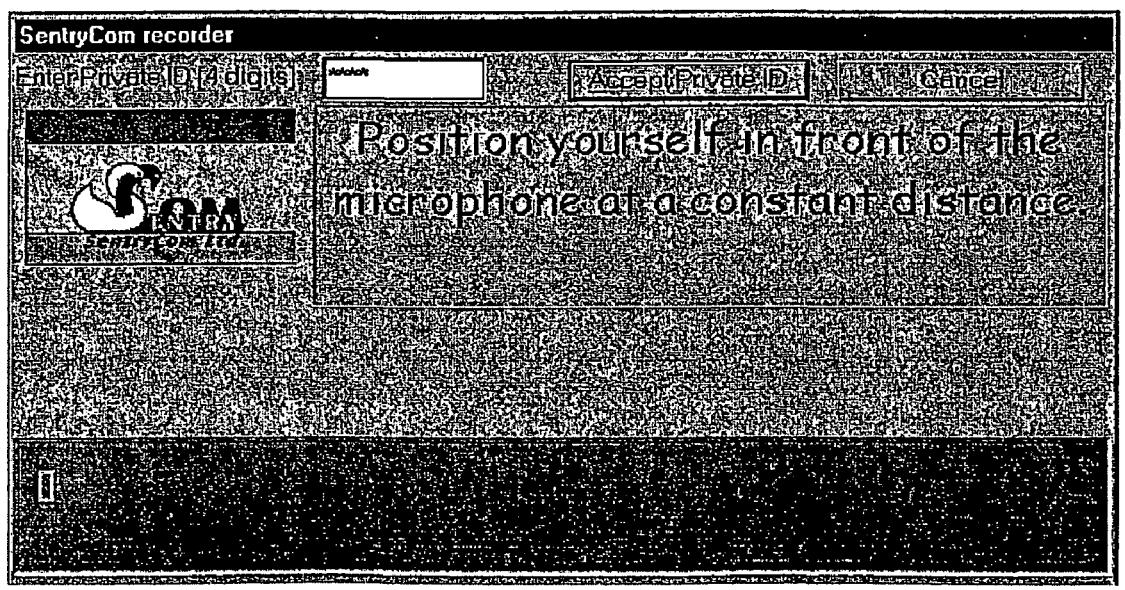
FIG. 7 illustrates an example of the signing procedure, using the DSM application.

For example, assume that a user was going to send the draft of a contract to a lawyer in another town. The user may want to give the lawyer the assurance that the document as sent arrives intact (is unchanged) and that the document is really from the sender. The execution of this model process is as follows:

1. Click the DSM icon from the user desktop, and enter the filename of the document to be signed (for example, the contract). An example of such a graphic user interface can be seen in FIG. 6.
2. When the voice recorder (a usage of the GUI to prompt the user to say the required random words or digits) of the DSM application is activated, the user is requested to enter the user PIN number and say the prompted number combinations. An example of such a graphic user interface can be seen in FIG. 7.

3. Using the DSM software, an envelope is obtained for the document, including hashing (mathematical summary) of the document. The signed document is encrypted.
4. The encrypted document is then sent to the lawyer by e-mail.
5. The encrypted hash and voice print becomes the user's digital signature of the message. (Note that the digital signature will be different each time a user sends a message.)

At the other (receiving) end:

6. The lawyer receives the message, with the encrypted document as an attachment.
7. To make sure that the attachment is intact and from the stated sender, the lawyer opens the attachment, and starts the DSM application, which decrypts the received digital signature and verifies the sender's authenticity.

Figure 8:
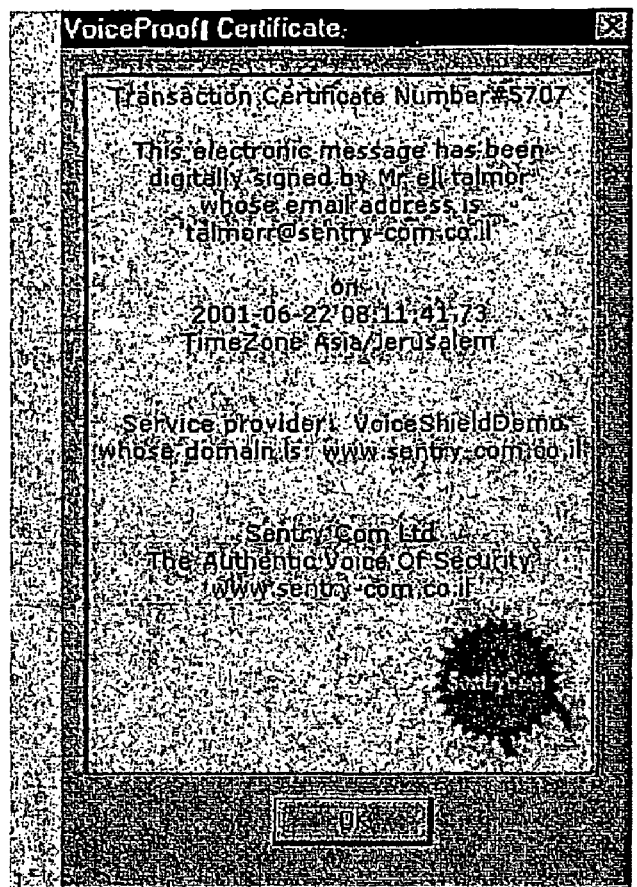
FIG. 8 illustrates a digital certificate, in the form of a date/time stamp, according to the present invention.

If the voice and hash match, the received message is valid and the sender's name, e-mail and date/time stamp will be received from the Authentication server, as shown in FIG. 8.

The voice signature of the present invention supplies very accurate, easy to use means to secure signed documents. It replaces the complexity and high price of alternative means of electronic signature.

Both the sender and the recipient may want to keep the received file in encrypted form as a proof of the transaction in case of a dispute. The document can be saved as a encrypted file for this purpose, such that the transaction certificate can be retrieved online at any time in the future.

If the sender needs the proof of the transaction, then both the sender and the recipient may open (unseal) the message and get a transaction certificate online.

The occurrence (date/time) of un-seal event (opening of digitally signed message) for the specific transaction is also recorded by the server. This may be used in the event of dispute about the date/time when the sealed bid envelope was open.

4. Using the Secure Messaging Module (SMM of the Present Invention to Enable Secure Messaging Services An additional software module of the present invention, hereinafter referred to as the "secure messaging module" or SMM, allows the user to encrypt a message, so that only specific person or persons will open this message. The opening of the message is performed if the recipient voice authentication was successful and the recipient personal info (such as First Name, Last Name, Gender and Email) matches those specified by the sender. The major advantage of SMM over PKI is that no Private Key is stored on a user's computing device. This eliminates the potential threat of breaking into the recipient computer and using his/her Private Key.

SMM utilizes client-server architecture. The client combines Voice Digital signature with Microsoft CAPI (Crypto API). The server allows is performance of the seal/unseal function, irrespective to any attack at the client level. SMM uses 128 bit encryption keys. To break this encryption at the client side (without connecting to the server), a total of $3.4*10^{38}$ random keys must be generated.

If the sender defined the seal option (which defines specific recipients of a message/data), then he/she may add himself/herself as a recipient. In this case, both the sender and the recipient may open (unseal) the message. The occurrence (date/time) of an un-seal event for the specific transaction is also recorded by the server. This may be used in the event of dispute about the date/time when the sealed bid envelope was opened.

If the number of recipients were specified (or a group was specified), then SMM enables "bulk" secure messaging.

If recipient authentication is specified, then the server sends a token of request # to the sender and in return the sender generates random symmetric encryption key and sends to this key to the server. If recipient voice authentication is successful then token of request # is send from recipient (client software) to the server. In return, the server sends the symmetric encryption key corresponding to this request.

Figure 9:
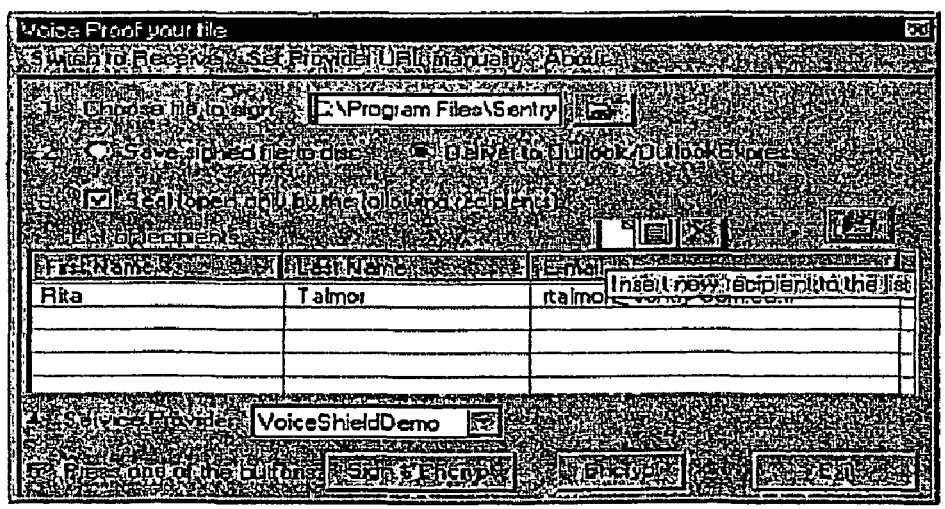
FIG. 9 is an illustration, according to the present invention, of the digital signature module and verifying data from the sender side.
Figure 10:
FIG. 10 is an illustration, according to the present invention, of the digital signature module and verifying data from the receiver side.
Figure 11:
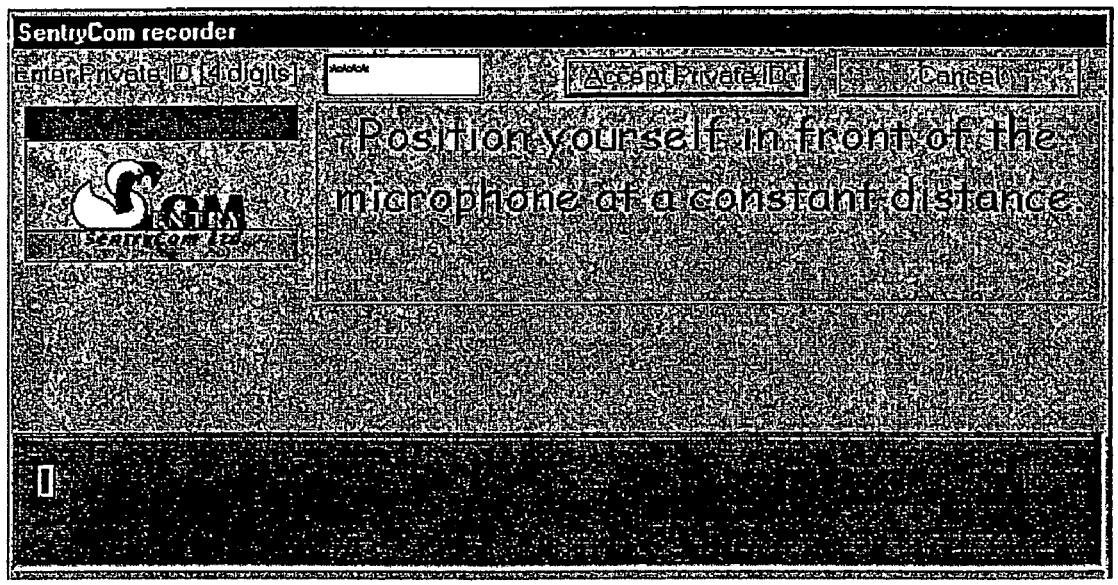
FIG. 11 illustrates the secure messaging process, according to the present invention, from the sender side.
Figure 12:
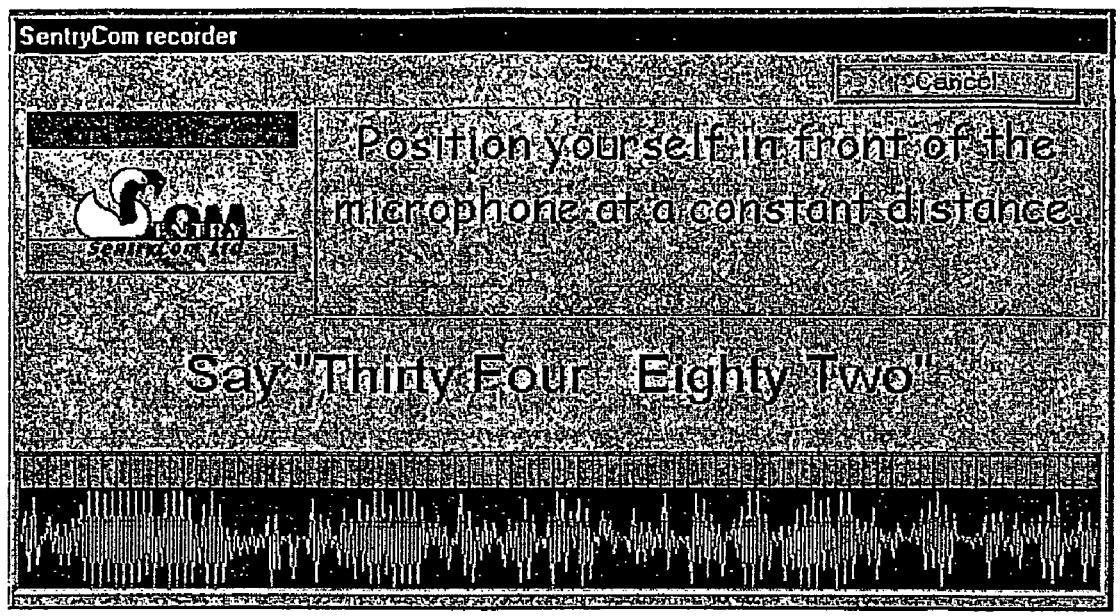
FIG. 12 illustrates the secure messaging process, according to the present invention, from the receiver side.

The digital signature authentication and secure messaging work according to the principles utilized in the following examples. In these examples, the term "VoiceProof" refers to DSM and SMM, and the term "VoiceShield" refers to SAM.

a. VoiceProof: Start 'VoiceProof' application from Command line or ICON running "..\Program Files\SentryCom\VoiceProof\VoiceProof.exe".
b. Then Main dialog box will pop up, as can be seen in FIG. 9:
c. the same dialog is used for Digital Signature and Secure Messaging applications, depending on buttons pressed or check boxes set.
d. There are 5 fields to set and use:
  Browse for the filename to seal and/or sign.
  Choose the result location (such as a file on a disk or an email attachment in Outlook/Outlook express).
  Choose recipient authentication mode (if set ON then list of recipient names could be filled out, stating registered users who can open this seal performing voice authentication. Recipient details can be inserted manually or chosen from Address Book. All names will be checked online against the Service Provider registrations).
  Choose Service Provider Name as follows:
1. To Sign & Encrypt, the sender should choose the Service Provider where s/he is registered. If the signed document will be sent to authenticated recipient, then both the sender and recipient should use same Service Provider (use "user directory" at provider's web site to check if recipient is registered there). In case that recipient is an anonymous sender and can only use the service provider where s/he is registered.
2. To Encrypt only, the sender can choose any Service Provider from the list suggested by VoiceProof or insert a name manually (choose entry "Set Provider URL manually" at the top of dialog window, and then type the address of service provider or go to "user directory" at provider's web site and cut/paste the address). But if the recipient should be authenticated, then the recipient Service Provider URL should be used.
  Choose an action: "Encrypt" only (for secured messaging) or "Sign and Encrypt" (for digital signature).
e. Note that 'Address book' is personal per login (kept in registry under, for example, HKEY_CURREN_USER entry). Email addresses inside the address book should match the Service Provider registration email address of this specific person. "User Directory" entry at the Service Provider web site should be used to check registrations.
f. The VoiceProof application is uses the VoiceShield application for voice sampling and Communication COM objects for data transmission over HTTP protocol, in XML format.
g. Upon "Sign/Encrypt" or "Encrypt" push button VoiceProof navigates to DigiSign servlet on the Service Provider Server, receiving Internet session identification and other session parameters.

h. If "Encrypt" only is used, then symmetric session key is used to encrypt the file. This session key will be saved in the Service Provider database, together with the session identifier. To use this method, the sender needs the Client download of the present invention only (no need to be registered!).
i. If "Sign and Encrypt" is used, then the sender is asked to perform voice authentication. His or her voice will be used as a file signature and a symmetric session key for file encryption. In addition, the file is hashed (to prevent changing its content), and the hash digest is signed with an asymmetric private key.
j. Public key (a pair to private key signing hash digest) and session key are sent to the Service Provider Server and written in the database together with the session identifier.
k. In both operation modes, the recipient authentication can be set, which causes only identified recipients to be able to see the original file. If Recipient Authentication is ON, then the sender should choose specific recipients registered with the present Service Provider. (Sender can fetch the names from his/her address book or insert manually in the recipient table).
l. Chosen recipients' details will be written in the Service Provider database together with the session identifier for further use at the recipient side. Choosing the "Save to file" feature utilizes the recipient authentication as well, allowing persons on the recipient list only to open the saved file. If Outlook is used to email encrypted and signed files as attachments, then chosen recipients will automatically be added into the "To:" field.
m. To open a VoiceProof sealed document, double-click the file or email attachment with the relevant extension (in this case, a '*.scz', or press an entry such as "Switch to Receive" on top of the sender dialog window. Following this, the dialog window will be displayed, as can be seen in FIG. 10.
n. If the sender stated "Recipient Authentication" =ON, then VoiceShield voice sampling will be activated. The following sampling window will be displayed. the recipient should type, for example, a 4-digit PIN number that s/he received upon registration to a specific Service Provider and on specific PC, and then press "Accept Private ID" button. This can be seen in FIG. 11.
o. Following this, a window will be displayed and the recipient will be prompted to say 2 or 3 pairs of digits into the microphone, as can be seen in FIG. 12.
p. The Service Provider server then verifies the recipient identity, using session identifier, Recipient_PCID, Recipient PIN, and Recipient Voiceprint.
q. If the authentication result is True, or "Recipient Authentication" was OFF, then VoiceProof retrieves keys from Service Provider Server.
r. If the document was "Encrypted" only by the sender (no signature), then a symmetric Session key will be received and the document decrypted. The user can subsequently save the opened file to disk.
s. If the document was Signed and Encrypted by the sender, then the Public key and Session key will be received. Microsoft 128 bit Crypto API is an example of encryption software used with a symmetric "Session" key to decrypt the received encapsulated file, getting the original signed document and it's Hash-Digest received from the sender.
t. Then Public key is used on the original document to compute a Hash Digest and then the resulted hash digest is compared to the Hash Digest received with an envelope.
u. If the Hash verification gave a positive result, then VoiceProof will get and display the Senders' Certificate (valid for the present transaction only) from the Service Provider Server, containing the transaction ID (session identifier), Sender Name, email address, date and time of transaction, Server Provider domain address etc.

5. Using the Secure Transactions Module (STM) to Execute Secure Transactions

The current state-of-the art in the online transactions sector has the following problems:

i. The access to "bogus number programs" is password protected, so that one can steal the password and following that the credit card security can be compromised.
ii. The merchant receives the bogus number from the user. If the user denies the purchase, there is no proof of purchase at the merchant site, and this may result in customer repudiation.

The present invention solves these problems by using a biometric method of user authentication, such as voice authentication, fingerprint, iris and retina scan, face and signature verification. The following example shows a Voice Authentication system for this purpose.

Figure 13:
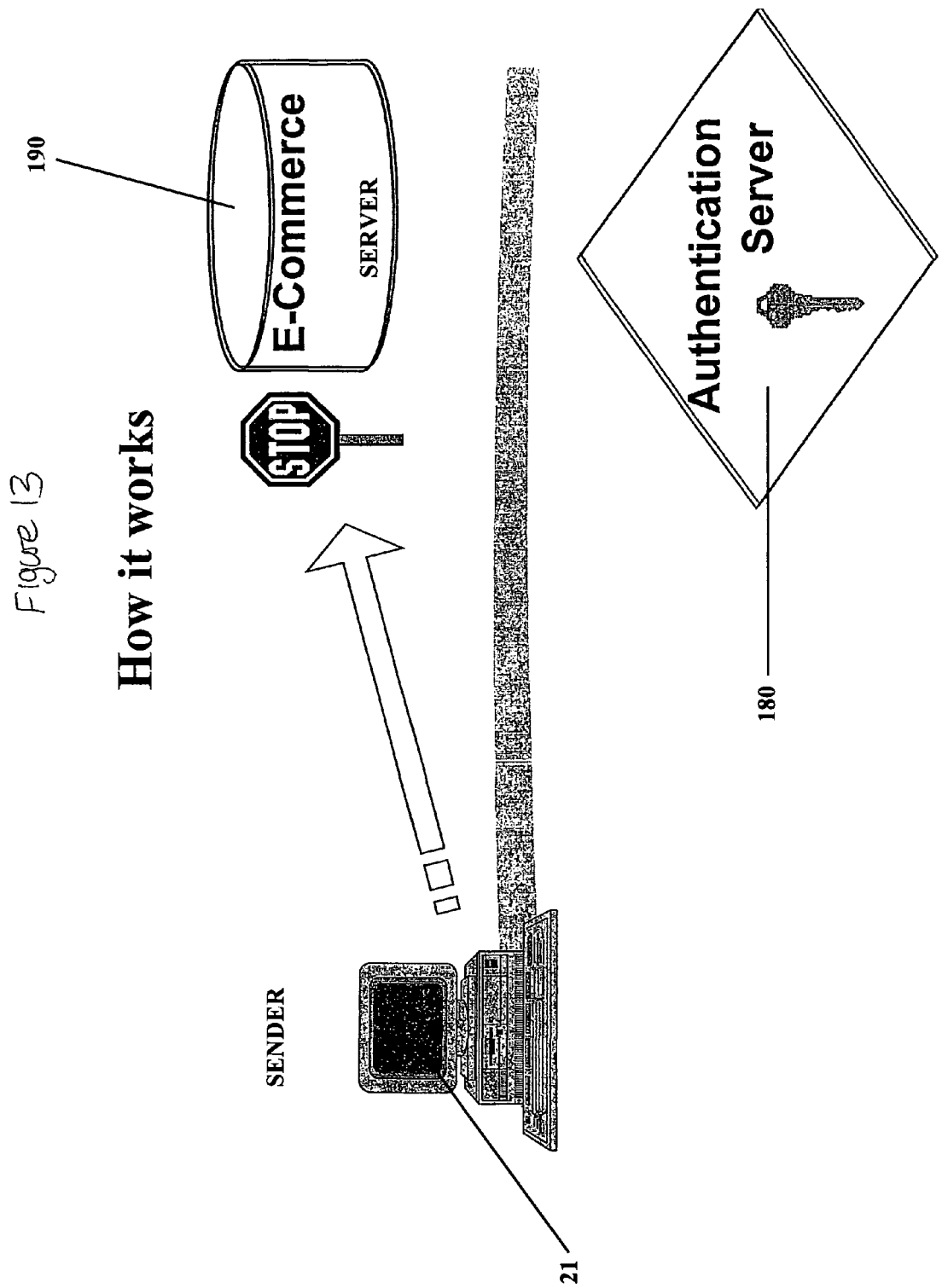
FIGS. 13, 14 and 15 illustrate various stages in the secure transactions process.
Figure 14:
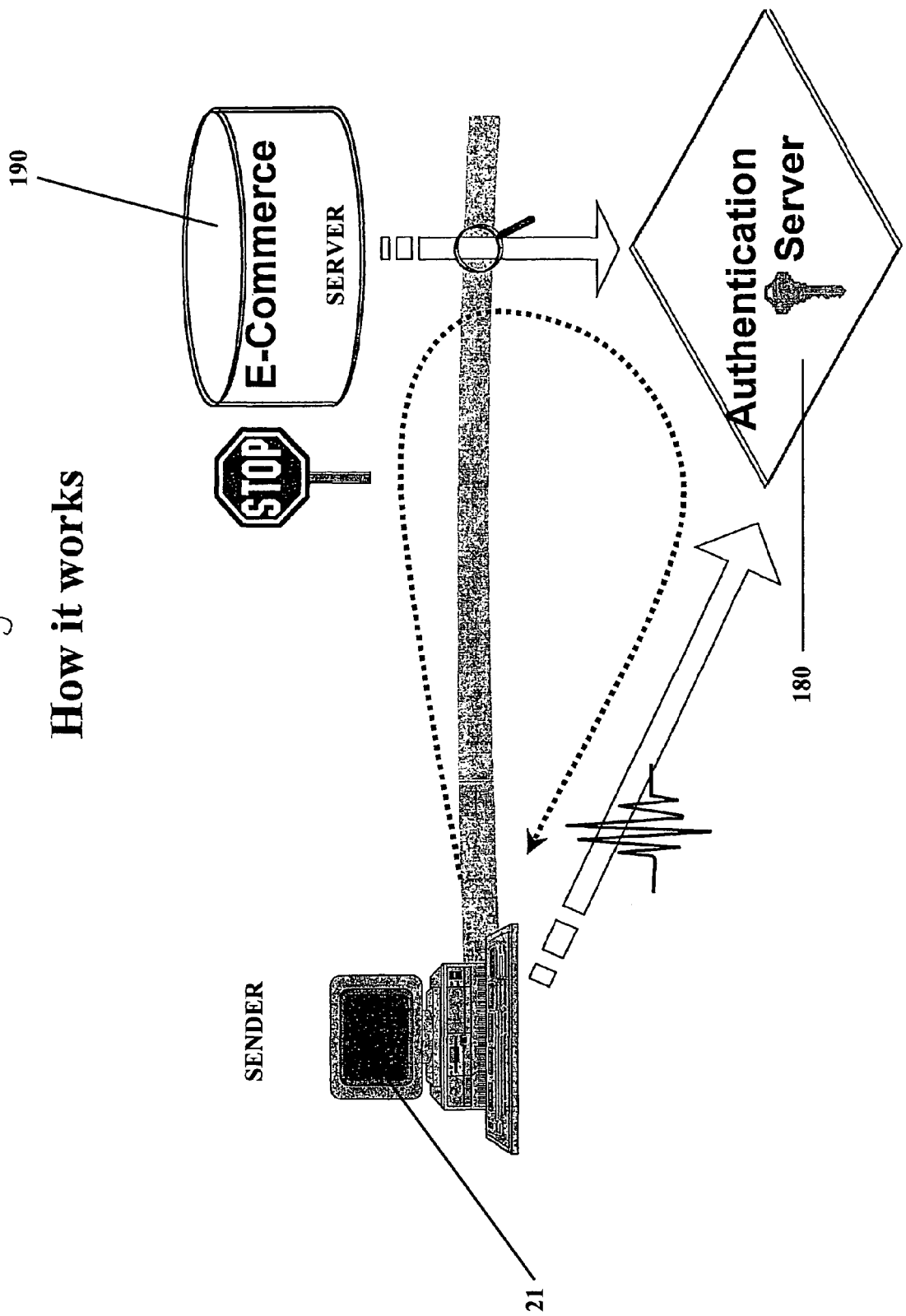
Figure 15:
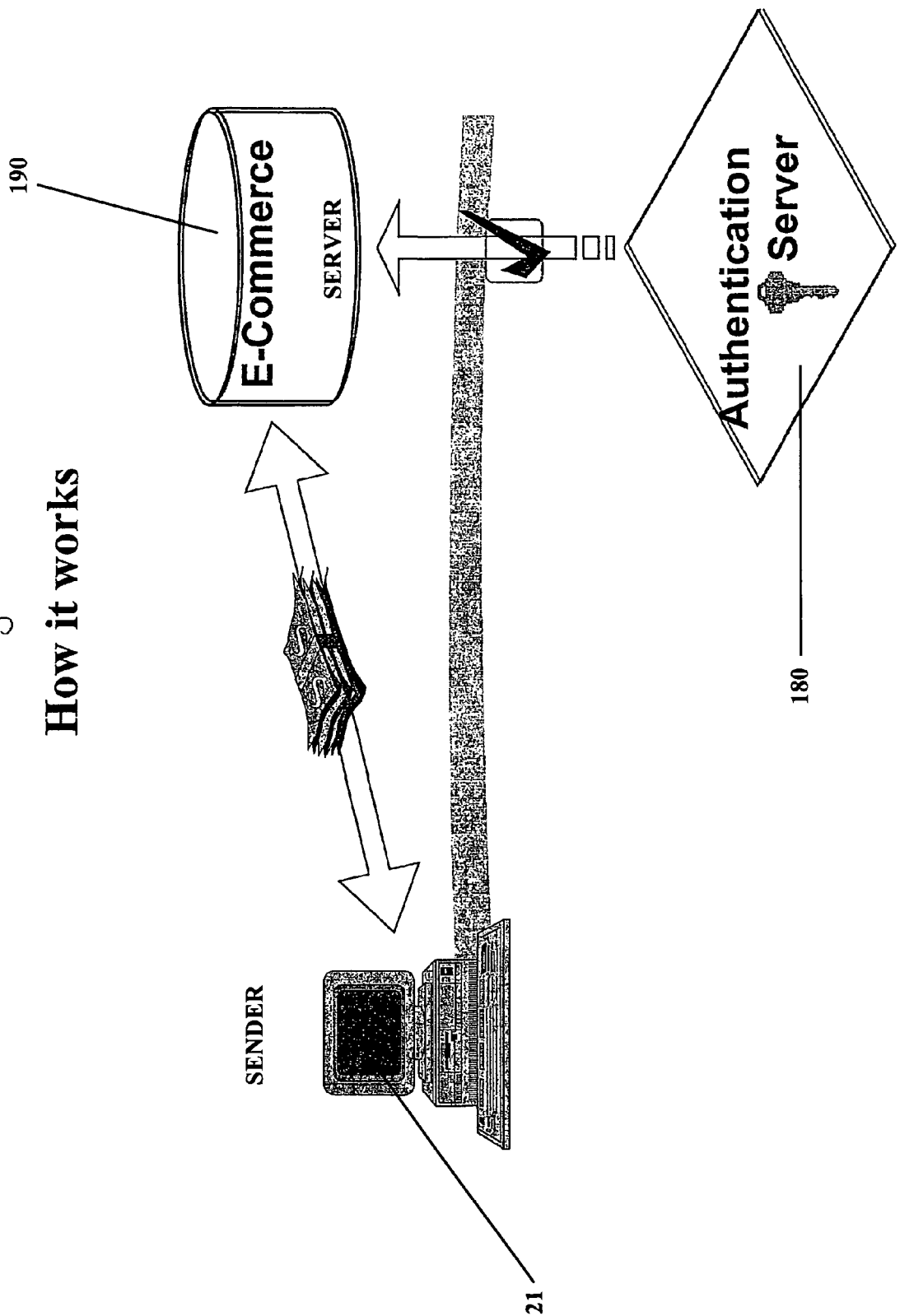

As can be seen in FIG. 13, according to the present invention, an attempt to execute a transaction directly (for example using a user's real Credit Card number) with an E-commerce client is stopped. The request is then channeled to the authentication server, as can be seen in FIG. 14. The authentication server subsequently verifies the user, and upon authentication, the authentication server executes the transaction directly with the E-commerce client, as can be seen in FIG. 15. In this way, no vulnerable information has been sent to the E-commerce client from the user, and the server acts as a business registrar to verify both the user and the E-commerce client before executing the transaction. A transaction can be executed by sending a biometric signature (one-time password or electronic signature generated out of biometric sample). The authentication process for Secured Credit Card Transaction, in detail, is as follows, as is illustrated with reference to FIG. 16:

Step 1: User Voice Authentication 300 involves speaking randomly prompted numbers to the PC microphone, hooked to the PC sound card or cellular phone. The speech is digitized and data (user voice print) is send to the Card Issuer Authentication Server 310.

Step 2: If this voice print matches the user registration voiceprint, the identity of the user is authenticated, and a decision 320 is taken to proceed with the transaction.

Step 3: The User Voice print (data) is encrypted into a VoiceKey 330, which refers to a biometric signature or voice-based key for performing secure transactions. For example, the VoiceKey may have 20 digits, created by using an encryption algorithm.

Step 4: The VoiceKey is separated into a format accepted by Credit Card/escrow/financial companies. For example, the VoiceKey may be separated into a 16 digit VoiceCard number and 4 digit Voice Card expiration date number 340. The VoiceCard, in the current example, refers to a voice-based virtual credit card which may be used in place of a physical credit card for transaction purposes. These numbers are sent to the Card Issuer 350 for transaction authorization. This is a one-time purchase Credit Card number to be used for the current transaction only.

Step 5: The user subsequently fills out the relevant (conventional) purchase form 360, and inserts his/her VoiceCard number and the expiry date into the form 370 on the merchant's site, and submits this form 380 in order to authorize the transaction.

Step 6: The form arrives at the merchant transaction database, and the VoiceCard number and expiration date are stored as proof-of-purchase 390, to be used in possible future repudiation disputes.

Step 7: The merchant processes the transaction 400 and sends it to the card issuer 350 to clear it over conventional Card Clearinghouse infrastructure.

Step 8: The Card issuer matches the VoiceCard numbers received from merchant and the user, and charges the transaction to the real Credit Card number of the user. In case of a customer dispute, certain transaction details, such as date, time and merchant can be cleared, if the voice print of the user matches (off-line, according to Step 3) the VoiceCard numbers of the transaction.

The user performs voice authentication at his or her PC via the card issuer voice authentication server. If authentication is successful (i.e. the user has been previously registered with the card issuer) then the 20 digit VoiceKey is created out of voice print using Publicly Available Crypto Algorithms. This key is then separated into, for example, a 16-digit VoiceCard number and 4 digit expiration date number. This number is not a "bogus" number, as used in systems known in the art, but is rather "proof-of-purchase " number, since it is directly related to user voice print. (If required, the voice print, which is stored with the issuer, can be transformed into a proof-of-purchase number using a pre-determined numerical algorithm). In the case of purchase repudiation, the merchant may send the "proof-of-purchase" number to the issuer, who may subsequently take the voice print of the user for the disputed transaction, and will thereby regenerate the "proof-of-purchase " number. If the two numbers are identical, the process is completed.

Active and Passive usage of SAM, DSM, SMM and STM- or Connectivity Between Different Service Providers The SAM, DSM, SMM and STM modules use a client-server architecture, where the server is operated by a Service Provider, such as Banks, Companies, and Credit Card Operators etc. The client side may be operated on PCs, PDAs, cellular phones any other Internet enabled computing devices.

According to Alternative Embodiments of the Present Invention, Clients May be Active or Passive:

Active clients may use all of the above-mentioned modules while actively performing Voice Authentication for secured access (SAM), digital signature and recipient authentication (DSM and SMM), and secure transaction (STM). Active clients may register and enroll their biometric data (Voice prints) with multiple Service Providers simultaneously. Each active client may register on multiple PCs or computing devices within each provider. Active clients of different providers may exchange digitally signed messages. Active user recipient from different provider or passive user receives the Business Registrar services of the sender, without registering with the sender's service provider as well.

In case of secure messaging active clients of different service providers or passive clients not registered with any provider must check the recipient names at the Web-based Active Directory of the recipient providers. Active Directory contains the following information: Gender, First Name, Last Name, Email and Service Provider Name. Sender enters recipient email address and receives all other fields (Gender, First Name, Last Name and Service Provider Name to fill into the dialog box in the graphic user interface of the various applications.

The active clients require:

Hardware: Sound Card or SoundDevice on motherboard
    PC microphone (with headphone for office use or clip-on for home use)

Software: Windows 98/ME/NT/2000, Internet Explorer 5.5 with 128 bit cypher.
    Download: SRM, SAM, DSM, SMM and STM Passive clients may use DSM and/or SMM in a limited fashion. Passive clients can receive digitally signed documents from active senders, and use Business Registrar services of their providers. Passive clients may send Secure message to be opened by active recipients. Passive clients may become active at any time.

Passive clients require:

Software: Windows 98/ME/NT/2000, Internet Explorer 5.5 with 128 bit cypher.
    Download: DSM, SMM and SAM (combined product).

Both Digital Signature and Secure Messaging can be utilized by active users of different Service Providers, and even by passive users in a limited fashion.

In an additional embodiment of the present invention, there is provided a case where a user of the present invention does not require any application specific software or hardware, in order to gain secure access to the a required application using the authentication server. For example, a user may use a cellular telephone to perform voice authentication by doing the following:

i. The user (who has pre-registered his/her voice sample and his/her cellular phone number) submits his/her cellular phone number in the relevant Web page, using a network enabled computing device.

ii. The authentication server calls the user on his/her cellular phone number, and requests the user to perform the voice authentication procedure;

iii. If the authentication is successful, the user receives a one-time password, by voice or SMS.

iv. The user enters this one-time password in the Web page and gets secure access from the network enabled computing device.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A system for data and user authentication using biometric means, to verify to a third party that a document purporting to be from a first party is an unaltered version of a document issued by said first party, the system comprising:

a) at least one network enabled client device for sending data to a network;

b) at least one biometric data input mechanism on said client device for capturing biometric data, said data input mechanism further being configured to digitally bind said captured biometric data at said client device to a document, said digital binding comprising encrypting said document using a session key generated from said biometric data, said session key being retained for subsequent decryption of said document therefrom at an instigation of said third party; and c) an authentication server configured with storage for storing said session key, said storage making said session key available for said instigation by said third party, and enabling remote data and user authentication at said authentication server side and further configured to pass a token to said client device if said user authentication is successful, said token to enable generation of said binding in association with said authentication, said binding thereby verifying the document in a current version as coming from said first party, and reversing said binding using said session key thereby verifying to said third party that a document obtained thereby is said current version from said first party, said first party identification thereby comprising biometric identification.

2. The system of claim 1, wherein said authentication server further comprises:
 i) a web-server component for serving HTTP requests;
 ii) a business logic application for matching between biometric data to be verified and stored biometric data; and
 iii) at least one database for storing system data.

3. The system of claim 1, wherein said authentication server includes:
 i) a registration module for enabling secure remote registration to the authentication server; and
 ii) a secure access module for enabling secure access to data stored on a network, said secure access enabling one-time user authentication, following said secure remote registration.

4. The system of claim 3, wherein said secure access module is designed and configured to verify a biometric sample, a unique device identity and a PIN.

5. The system of claim 3, wherein the secure access module comprises a digital signature module designed and configured for enabling the one-time user authentication.

6. The system of claim 5, wherein said digital signature is designed and configured to verify a biometric sample, a unique device identity and a PIN.

7. The system of claim 3, wherein the secure access module comprises a secure messaging module designed and configured to enable secure messaging between at least two network-enabled client devices.

8. The system of claim 7, wherein said secure messaging module is designed and configured to verify a biometric sample, a unique device identity and a PIN.

9. The system of claim 3, further comprising a secure transactions module for enabling secure network-based transactions between said client devices and network-based commercial entities, said transactions requiring one-time user authentication.

10. The system of claim 9, wherein said secure transactions module is designed and configured to verify a biometric sample, a unique device identity and a PIN.

11. The system of claim 1, further comprising at least one additional network-enabled client device for receiving data from first said at least one network-enabled client device and from said authentication server.

12. The system of claim 1, wherein said digital binding comprises applying one member of the group consisting of whole document encryption, whole document tagging, and whole document attachment.

13. A method for enhancing data and user authentication using a biometric mechanism to verify to third parties that a document purporting to be from a first party is an unaltered version of a document issued by said first party, comprising the steps of:
 a) enabling secure biometric remote registration by at least one user;
 b) authenticating user identity, by an authentication server, by means of a secure data access procedure implemented from a client side device, said secure data access procedure comprising digitally binding biometric data of said biometric remote registration to a document, said digital binding comprising reversibly encrypting said document using a session key generated from said biometric data;
 c) storing said session key for said third parties to make authentication queries on said document;
 d) sending a token from said authentication server to said client side device following said data and user authentication, said token enabling said binding to be generated in association with said authentications;
 e) subsequently decrypting said document using said session key at the instigation of one or more of said third parties, said decrypting using said session key providing said data and user authentication, said user authentication thereby comprising biometric identification.

14. The method of claim 13, further comprising accessing said authentication server from a plurality of devices, said devices selected from the group consisting of PCs, laptops, PDAs, smart phones, cellular phones, wireline phones and mobile computers.

15. The method of claim 13, further comprising
 c) execution of a digital signature verification procedure, by said authentication server, to authenticate a digital signature of said authenticated user.

16. The method of claim 13, wherein said authenticating said user identity includes the steps of:
 i) registering personal details with an authentication server, by said user;
 ii) registering at least one biometric characteristic with said authentication server, by said user;
 iii) sending a secret number to said user, by an authentication server;
 iv) logging in to said authentication server, using said secret number, a computer device ID and at least one biometric characteristic, by said user; and
 v) verifying said user, by comparing said login data with said registered information, such that said registered information includes said computer device ID and at least one said biometric characteristic.

17. The method of claim 14, wherein said accessing said authentication server from a plurality of devices includes the steps of:
 i) authenticating said user;
 ii) creating a roaming diskette for said user; and
 iii) performing authentication actions on a computing device that is compatible with said diskette, using said diskette;
 wherein said roaming diskette enables accessing said authentication server from a plurality of devices.

18. The method of claim 13, wherein said secure data access procedure includes the following steps:
 i) providing a memory unit for storing information including a stored voice print and an identity of each of a plurality of individuals, said stored voice print of each of said plurality of individuals being generated from corresponding voice data thereof;
 ii) collecting information provided by said user, said information being for verifying that said user is a specific individual from among said plurality of individuals;
 iii) processing temporary voice data collected from said user into a temporary voice print;
 iv) comparing said temporary voice print with said stored voice print of each of at least a portion of said plurality of individuals including said specific individual; and v) granting access to said user, only if said temporary voice print is similar to said stored voice print of said specific individual.

19. The method of claim 18, wherein a sender signs and sends a digitally signed message and a recipient, receiving the digitally signed message opens the message; and wherein the opening causes a notification of opening to be sent to an authentication server, the server responding by sending a transaction certificate to said recipient, said certificate including information selected from the group consisting of a sender's email, date stamp, time stamp, gender, first name, last name, service provider name, public key of said transaction, and a digital signature signed by a Business Registrar.

20. The method of claim 15, wherein said execution of a digital signature verification procedure includes the steps of:
   i) entering, by a sender, a location of an information source to be signed;
   ii) requesting said sender to enter a user PIN and entering prompted combinations;
   iii) obtaining an envelope for said document, such that said envelope facilitates hashing of said document;
   iv) encrypting said document using a hashing mechanism;
   v) sending said encrypted document to at least one receiver as a message; and
   vi) combining said encrypted document and said prompted combinations to form said user's digital signature of the message.

21. The method of claim 20, further including the steps of:
   vii) receiving said message, with said encrypted document as an attachment thereof;
   viii) opening said attachment, and starting a digital signature module (DSM) application to decrypt the received digital signature and verify sender's authenticity; and
   ix) comparing a voice and a hash of said hashing mechanism, and validating said received message only if the voice and the hash match, and receiving sender user/personal details from said authentication server.

22. The method of claim 20, wherein step vi further comprises storing said digital signature as user proof-of-purchase.

23. The method of claim 13 further comprising execution of a secure messaging verification procedure.

24. The method of claim 23, wherein said execution of a secure messaging verification procedure includes:
   i) creating a message;
   ii) sending the message to a receiver;
   iii) obtaining a voice sample of the receiver;
   iv) authenticating the voice sample of the message receiver receiving the message;
   v) matching recipient personal information with information specified by a sender; and
   vi) opening said message.

25. The method of claim 24, wherein authenticating a voice sample of the message receiver comprises the steps of:
   1) sending a token of a request number to a message sender, by said server;
   2) generating a random symmetric encryption key and sending said key to said server, by said message sender;
   3) if the voice sample of the message receiver is authenticated by said server, sending said token of request number from said recipient to said server; and
   4) sending said symmetric encryption key corresponding to said request, by said server.

26. The method of claim 24, wherein said sender specifies a plurality of recipients.

* * * * *